United States Patent
Hannah (10) Patent No.: US 6,711,216 B2
(45) Date of Patent: Mar. 23, 2004

(54) METHOD AND APPARATUS FOR AN ULTRA-WIDEBAND RADIO UTILIZING MEMS FILTERING

(75) Inventor: Eric C. Hannah, Pebble Beach, CA (US)

(73) Assignee: Intel Corporation, Santa Clara, CA (US)

( * ) Notice: Subject to any disclaimer, the term of this patent is extended or adjusted under 35 U.S.C. 154(b) by 264 days.

(21) Appl. No.: 09/895,133

(22) Filed: Jun. 28, 2001

(65) Prior Publication Data

US 2003/0002592 A1 Jan. 2, 2003

(51) Int. Cl.[7] .............................. H04B 1/69; H04L 25/49
(52) U.S. Cl. ........................................ 375/296; 375/130
(58) Field of Search ................................. 375/296, 130, 375/259, 367, 229

(56) References Cited

U.S. PATENT DOCUMENTS

| | | | | |
|---|---|---|---|---|
| 3,535,473 A | * | 10/1970 | Flanagan et al. | 379/406.08 |
| 4,615,040 A | * | 9/1986 | Mojoli et al. | 375/267 |
| 5,659,581 A | * | 8/1997 | Betts et al. | 375/296 |
| 5,675,644 A | * | 10/1997 | Sih | 379/406.08 |
| 5,677,927 A | * | 10/1997 | Fullerton et al. | 375/130 |
| 5,896,420 A | * | 4/1999 | Kaku et al. | 375/285 |
| 6,084,919 A | * | 7/2000 | Kleider et al. | 375/285 |
| 6,185,261 B1 | * | 2/2001 | Creigh et al. | 375/285 |
| 6,238,946 B1 | | 5/2001 | Ziegler | |
| 6,480,532 B1 | * | 11/2002 | Vareljian | 375/222 |

FOREIGN PATENT DOCUMENTS

DE    199 45 273    3/2001

OTHER PUBLICATIONS

PCT International Search Report dated Oct. 11, 2002 (International Application No. PCT/US 02/19644.

* cited by examiner

*Primary Examiner*—Stephen Chin
*Assistant Examiner*—Lawrence Williams
(74) *Attorney, Agent, or Firm*—Blakely, Sokoloff, Taylor & Zafman LLP (57) ABSTRACT

A method and apparatus for a UWB radio utilizing MEMS filtering is described. The method described includes receiving a pulse signal from a transmission station. Once received, a delay line including one or more taps is driven with the pulse signal. Once the pulse signal exits the delay line, the delay line is sampled at each of the taps to determine a time delay and amplitude of each echo in the pulse signal. These steps are repeated for each pulse signal received until a delay/amplitude map of the transmission channel between the stations is complete. Using the echo map, a time delay and amplitude of each echo indicated by the map is determined synthetic and recursive anti-echoes. Accordingly, when transmitting or receiving a signal over the channel, anti-echoes are combined with the signal in order to eliminate channel echoes in a received signal.

20 Claims, 10 Drawing Sheets

METHOD AND APPARATUS FOR AN ULTRA-WIDEBAND RADIO UTILIZING MEMS FILTERING

FIELD OF THE INVENTION

The present invention relates generally to micro electromechanical structures. In particular, the present invention relates to an apparatus and method for an ultra-wideband radio utilizing MEMS filtering.

BACKGROUND OF THE INVENTION

A wireless, local area network (LAN) is a flexible data communications system that can either replace or extend a wired LAN to provide additional functionality. Using radio frequency (RF) technology, wireless-LANs transmit and receive data over the air, through walls, ceilings and even cement structures, without wired cabling. A wireless-LAN provides all the features and benefits of traditional LAN technologies, such as Ethernet and Token Ring, but without the limitation of being tethered to a cable. This provides greater freedom and increased flexibility.

In other words, a Wireless-LAN is a network in which a mobile user can connect to a local area network (LAN) through a wireless (radio) connection. A standard from the Institute of Electrical and Electronic Engineers (IEEE) 802.11B-1999, published Sep. 16, 1999 specifies the technologies for wireless-LANs. Accordingly, high bandwidth allocation for wireless-LANs will enable, at a relatively low cost, wiring of various buildings, such as classrooms, in the United States. One technique for providing high bandwidth allocation in a wireless-LAN is provided via ultra wide bandwidth (UWB) radio systems.

UWB radio systems employ the transmission of very short pulses of radio energy. These characteristic spectrum signatures extend across a wide range of radio frequencies. In addition, since UWB signals have high bandwidth and frequency diversity, UWB signals are particularly suited for high speed data communications in environments, such as indoors, where multi-path fading is likely. Consequently, UWB radio systems are generally well-suited for implementing a wireless-LAN.

Moreover, the radio spectrum utilized by wireless communication is considered to be fully utilized and, in fact, in short supply. In contrast, UWB signals, by their very nature, utilize spectrum already designed for other use and regulated by the Federal Communications Commission. Unlike continuous wave technologies that use sine waves to encode information, UWB technologies encode large amounts of information over short distances, using brief, extremely low power bursts or pulses of radio energy spread across a wide range of frequencies. As indicated above, one of the most appealing characteristics of UWB technology is its place in the frequency spectrum, a characteristic directly associated with low power consumption and interference immunity.

Accordingly, by transmitting data at a very low power, UWB devices are able to use spectrum already occupied by radio devices. This characteristic enables UWB technology to recycle spectrum, a characteristic of great value in a time when spectrum, a scarce resource, is in high technological demand. Unfortunately, wireless-LANs utilizing UWB radio signals may suffer from echoes due to multi-path fading. This problem becomes particularly serious when considering that a wireless-LAN must transmit signals and receive data over the air through walls, ceilings and even cement structures, without wired cable. As a result, transmission through such structures may cause echoes as the transmitted signals bounce off the walls.

Therefore, there remains a need to overcome one or more of the limitations in the above-described, existing art.

BRIEF DESCRIPTION OF THE DRAWINGS

The features, aspects, and advantages of the present invention will become more fully apparent from the following Detailed Description and appended claims when taken in conjunction with accompanying drawings in which:

DETAILED DESCRIPTION OF THE INVENTION

A method and apparatus for an ultra-wideband radio utilizing MEMS filtering are described. The method described includes receiving a pulse signal from a communicating transmission station. Once received, a delay line including one or more taps is driven with the received pulse signal. Once the received pulse signal exits the delay line, the delay line is sampled at each of the one or more taps to determine a time delay and amplitude of each echo in the received pulse signal. These steps are repeated for each received pulse signal from the communicating transmission station until the delay/amplitude map of the channel between the transmission station and the receiving station is complete. Once completed, the delay/amplitude map may be transmitted to the transmission station or utilized to remove channel echoes from input transmission signals received by the receiving station.

The method further includes the receipt of a delay/amplitude map of a channel. Using the delay/amplitude map, a time delay and amplitude of each echo indicated by the map is determined. Once each echo is determined, a synthetic anti-echo is generated, having the same time delay as the respective echo, but an inverse amplitude of the echo in order to cancel out any echoes over the channel. In addition, recursive echoes are also generated to remove echoes caused by the generated synthetic echoes. As such, when transmitting or receiving a signal over the channel, the synthetic echoes and recursive echoes are combined with the signal in order to eliminate all channel echoes in a received signal.

In the following description, for the purposes of explanation, numerous specific details are set forth in order to provide a thorough understanding of the present invention. It will be apparent, however, to one skilled in the art that the present invention may be practiced without some of these specific details. For example, the various transceiver configurations and circuits may be modified according to the teachings of the present invention. In addition, the following description provides examples, and the accompanying drawings show various examples for the purposes of illustration. However, these examples should not be construed in a limiting sense as they are merely intended to provide examples of the present invention rather than to provide an exhaustive list of all possible implementations of the present invention. In other instances, well-known structures and devices are shown in block diagram form in order to avoid obscuring the details of the present invention.

System Architecture

As described above, ultra wide bandwidth (UWB) radio systems send out very sharp pulses that intrinsically have a very wide spectral content. In contrast, traditional continuous wave radio systems transmit and receive spectrally controlled trains of sine waves. Accordingly, tuning and modulation of the UWB signals takes place in the time amplitude domain. As a result, UWB signals exhibit low power for a given signal to noise ratio, which leads to compatible interoperability with existing radio services. In addition, UWB radio signals have the ability to remove multi-path effects by pulse shaping and timing discrimination techniques.

Figure 1:
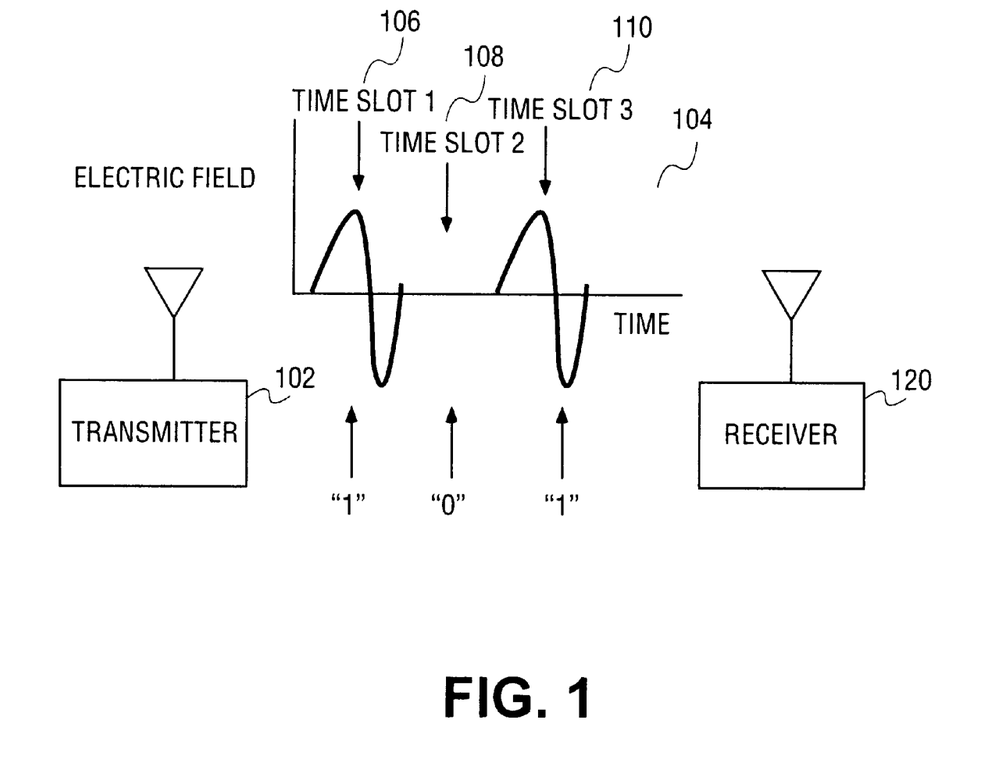
FIG. 1 depicts a timing diagram illustrating transmission of data signals between a transmitter and a receiver utilizing ultra-wide bandwidth technology in accordance with an embodiment of the present invention.

Referring to FIG. 1, a timing diagram 100 is illustrated depicting a transmitter 102 and a receiver 120. FIG. 1 also depicts a graph 104 of electrical fields versus time.

Accordingly, FIG. 1 shows how UWB radio transmits data between a transmitter 102 and a receiver 120. As described above, the pulses are very sharp in time, implying a very wide bandwidth infrequency. As such, modulation is achieved by either amplitude modulation or by time position variation. Referring again to FIG. 1, detection of data occurs by sampling data at one or more time slots 106, 108 and 110. During time slots '1' (106) and time slot '3' (110) sampling of a transmission channel yields the detection of a pulse, or digital 1'. The absence of a pulse at time slot '2' (108) indicates a digital '0'.

Figure 2:
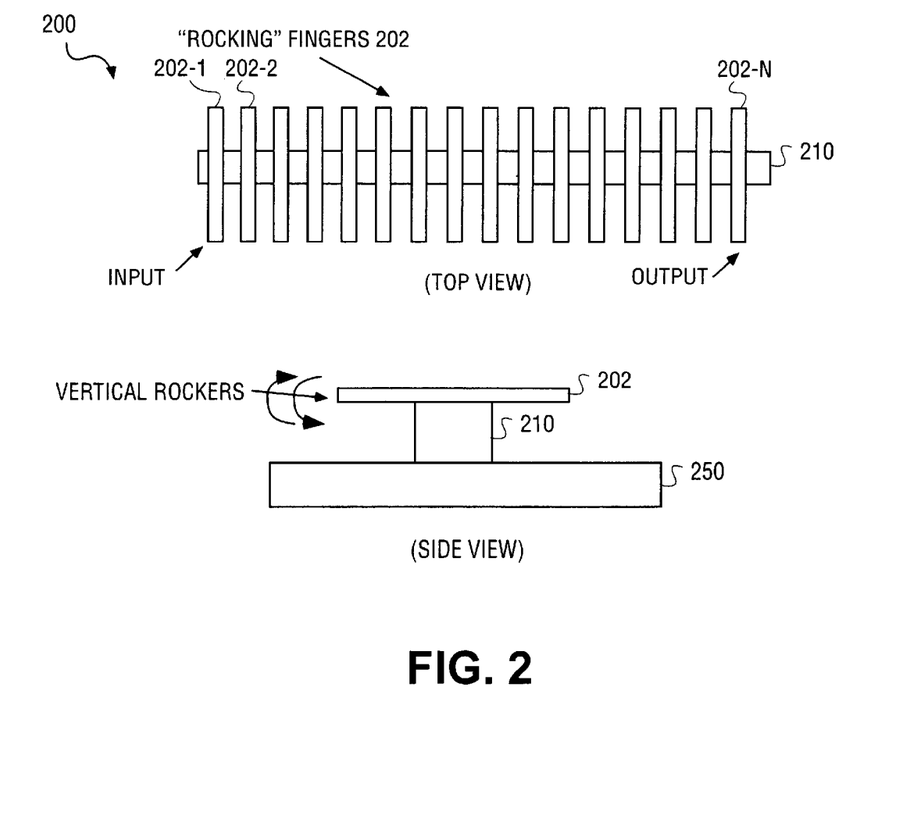
FIG. 2 depicts a block diagram illustrating a multi-task, micro-electro mechanical structure (MEMS) delay line in accordance with an embodiment of the present invention.

Referring now to FIG. 2, a block diagram is depicted which illustrates a micro-electrical mechanical system delay line 200. As known to those skilled in the art, micro-electrical mechanical systems (MEMS) are precisely etched silicon devices that have mechanical, as well as electrical, components. At current levels of lithography, MEMS filters and delay lines can support signals of up to 10 gigahertz (GHZ). For a multi-tap delay line, the speed of sound is some tens of kilometers per second (typical for solids), thus implying that a one millimeter long delay line can control signal delays of 0.1 microseconds.

Figure 3A:
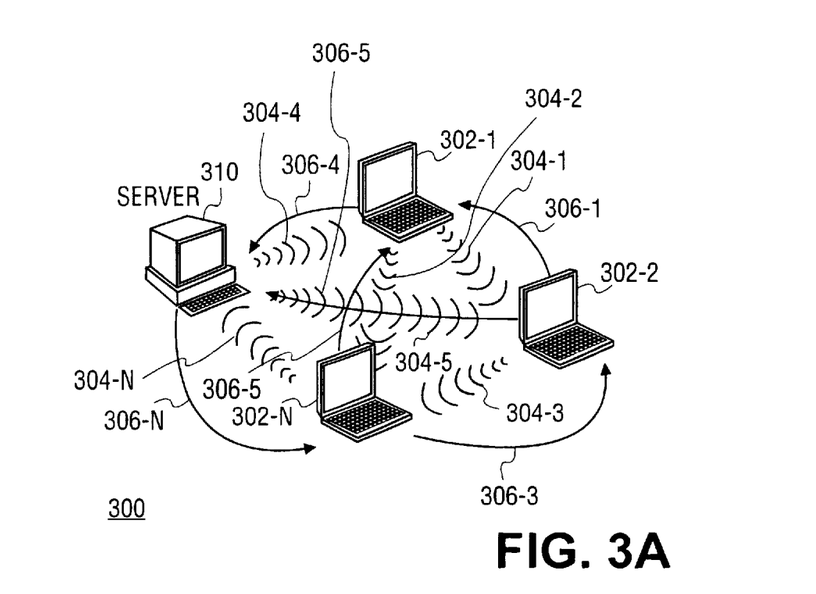
FIGS. 3A and 3B depict block diagrams illustrating peer-to-peer and client server configurations of a wireless local area network in accordance with a further embodiment of the present invention.
Figure 3B:
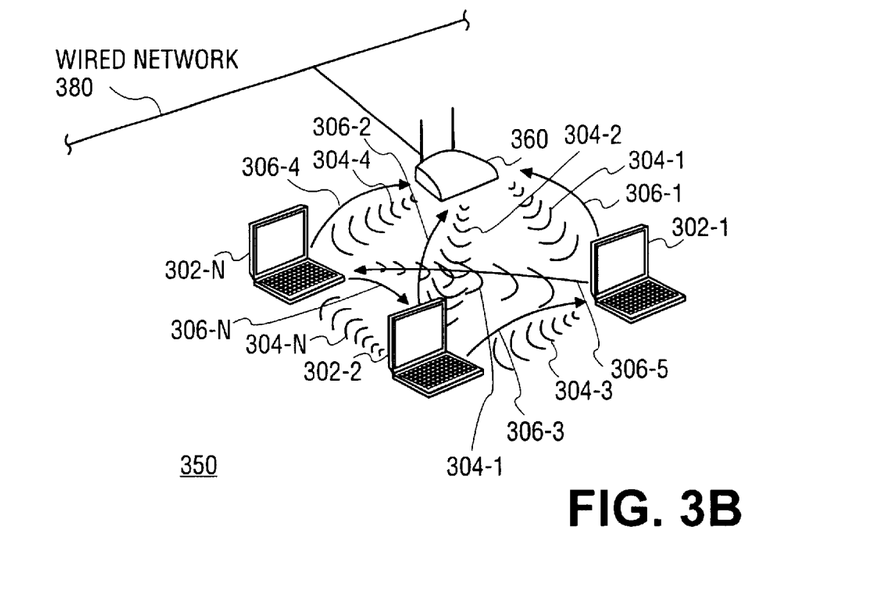

Moreover, metal taps can have spacing pitches of approximately 0.2 micrometers, which implies that the inter tap $\Delta$ delay times for delay line using metal taps can be as small as approximately 20 pico seconds. Multiplying these times by the speed of light implies that a MEMS delay line can control multi-path differential lengths from $6 \times 10^{-4}$ meters up to 30 meters. This considerable dynamic range can, in principle, compensate for all echoes in a wireless-local area network, for example as depicted in FIGS. 3A and 3B. Accordingly, by utilizing an ultra-wide bandwidth radio system transceiver, which includes a MEMS based delay line having multiple taps, base band (full bandwidth) echo compensation is possible.

Referring again to FIG. 2, the MEMS based delay line 200 consists of mechanical arms 202 (202-1, ..., 202-N) tied to a central spine 210. Rocking motion will be transmitted by electro-static forces down the chain of rocking arms 202. Rocking motion can be initiated by an electrostatic forces applied to the first rocker 202-1 and delayed samples of the input signal can be detected by capacitive pick-ups (not shown) which are attached to taps underneath successive rocker arms 202. Accordingly, the delay line may initially be driven by a data signal. Once driven, taps beneath the successive rocker arms can be sampled to determine if any additional signal noise or echoes are received along with the received data signal.

In one embodiment, the mechanical arms are non-uniformly spaced in order to simplify design and provide coarser sampling for longer echo delays, as described in further detail below. In other words, echoes that occur close in time to a pulse signal require precise time calculation. In contrast, echoes that occur further away from the incident pulse signal will spread out in time and require coarse time cancellation. Likewise, a time delay from receipt of the initial signal as well as an amplitude of each echo is determined by sampling the taps of the MEMS delay line 200.

Referring now to FIGS. 3A and 3B, a local area wireless network is depicted, which utilizes transceiver stations implemented using UWB radio. Referring now to 3A, a peer-to-peer wireless local area network configuration 300 is depicted. In a peer-to-peer configuration, two or more personal computers (PCs) 302 (302-1, 302-2, ..., 302-N) equipped with, for example wireless adapter cards, form a local area network which enables communication between each of the PCs 302 and a server computer 310. The peer-to-peer configuration 300 as depicted in FIG. 3 is principally used to quickly and easily set up a wireless local area network where no infrastructure is available, such as a convention center or offsite meeting location.

Referring now to FIG. 3B, a client server wireless configuration 350 is illustrated. In the client server wireless configuration 350 as illustrated in FIG. 3B, the PC computers 300 each include, for example, wireless adapter cards which enable communication with a wireless-LAN access point 360. As such, the PCs 302 are linked to a central hub, or LAN access point 360, that acts as a bridge to resources of a wired network 380. Unfortunately, regardless of the configuration used, wireless local area networks will suffer from noise due to interference from signals as they travel along and are affected by the environment, resulting in signal noise or channel echoes.

Figure 4A:
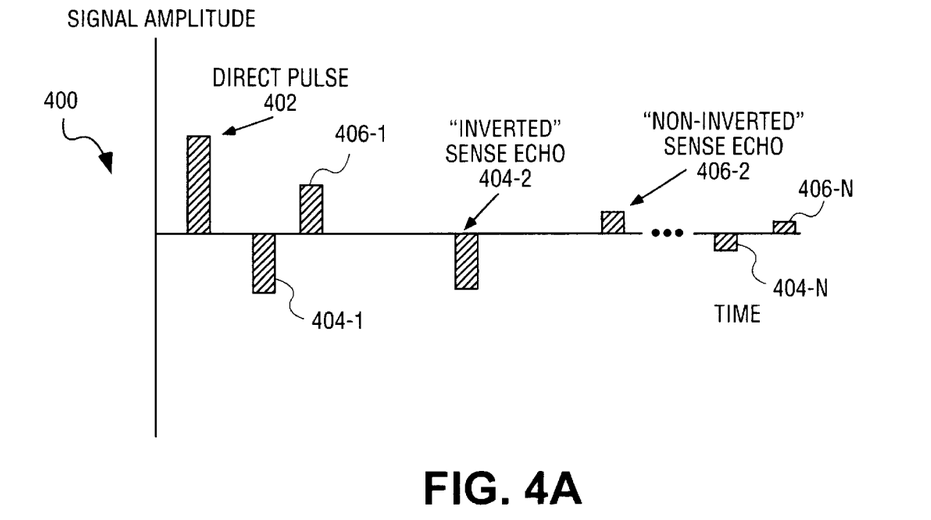
FIG. 4A depicts a timing diagram illustrating a direct pulse and various echoes which occur over a transmission channel in accordance with an embodiment of the present invention.
Figure 4B:
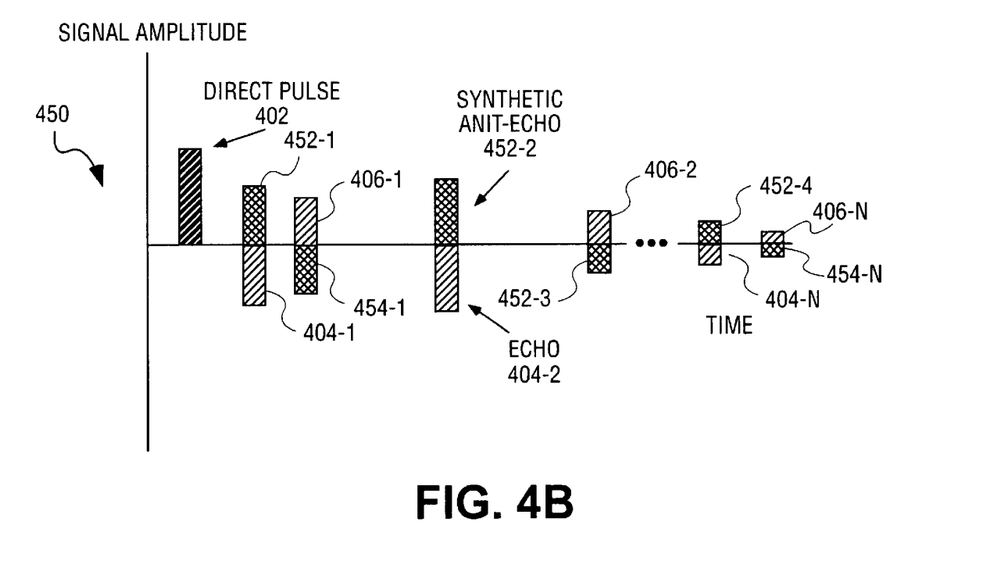
FIG. 4B depicts a timing diagram illustrating the echoes caused by the direct pulse as indicated in FIG. 4A and synthetic anti-echoes generated to cancel out each echo in accordance with an exemplary embodiment of the present invention.

Accordingly, current wireless-local area network systems will suffer from channel echoes, for example as depicted in FIG. 4A. Referring to FIG. 4A, a direct pulse 402 is illustrated, which includes several inverted echoes 404 (404-1, . . . , 404-N) and non-inverted echoes 406 (406-1, . . . , 406-N) (echo 404/406). In accordance with the teachings of the present invention, a multi-tap MEMS delay line may be used to sample each of the echoes 404/406 in the transmission channel in order to generate synthetic anti-echoes 452 (452-1, . . . , 452-N) and 454 (454-1, . . . , 454-N), as depicted in the signal amplitude versus time graph 450 of FIG. 4B. Accordingly, once each synthetic anti-echo 452/454 is broadcast, along with a data signal 402 through the transmission channel, the synthetic anti-echoes 452/454 will cancel out any echoes 404/406 caused by the data signal 402.

Consequently, utilizing a MEMS based delay line 200, as depicted in FIG. 2, a transceiver can receive continuous pulses from a communicating station and generate a delay/amplitude map of the transmission channel between the two stations. Using this echo map, the receiving station can either generate synthetic anti-echoes for its received input signals to remove channel echoes (post-compensation) or transmits the map to the communicating transmission station such that the transmission station may pre-distort its transmission signals based on the received delay/amplitude map (pre-compensation mode). As referred to herein, the term "channel calibration" refers to the post-compensation or pre-compensation of data signals in order to remove channel echoes from received signals.

Figure 5:
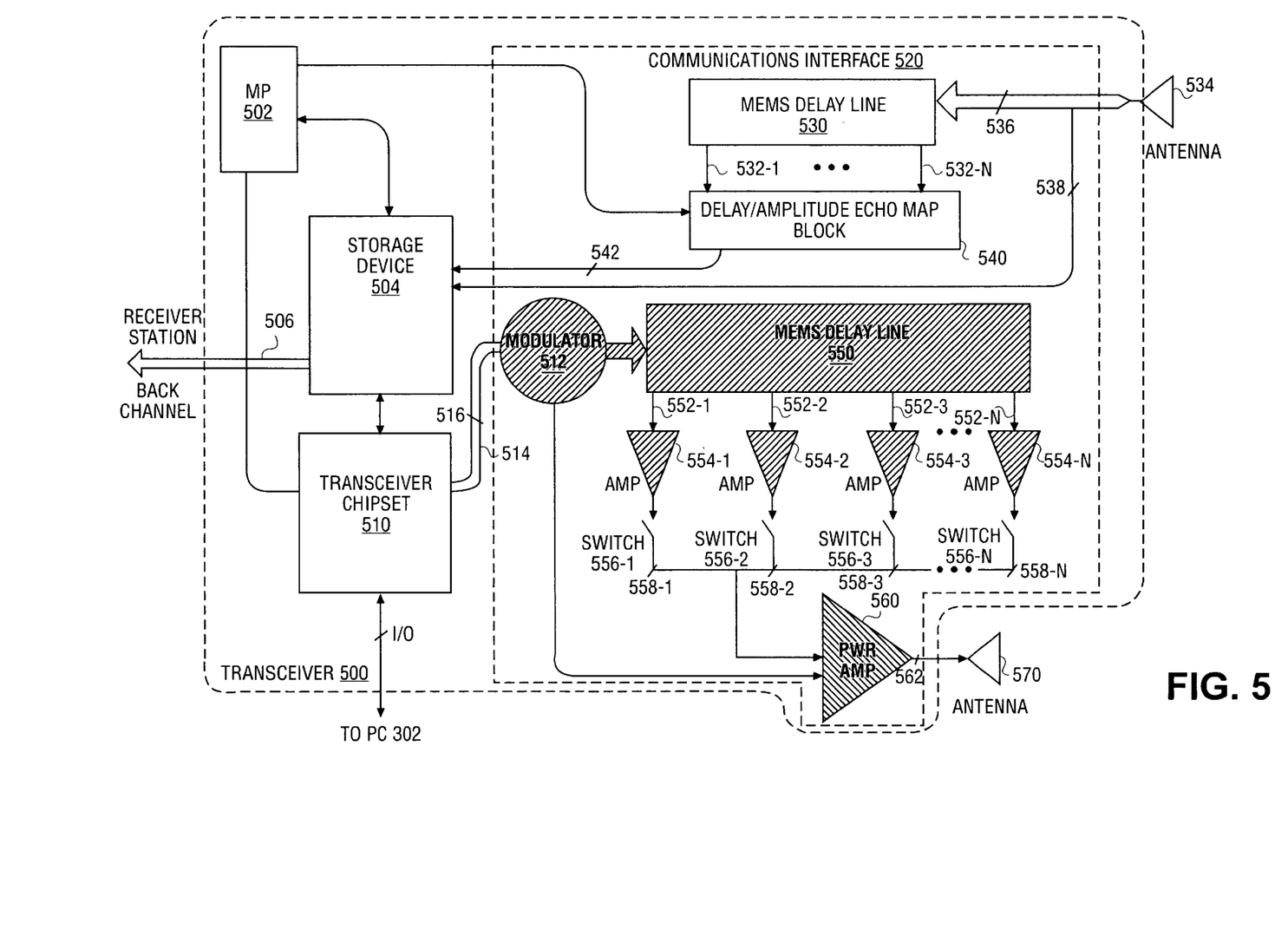
FIG. 5 depicts a block diagram illustrating a transceiver in accordance with an embodiment of the present invention.

Referring now to FIG. 5, a transceiver 500 is depicted which utilizes a multi-tap MEMS based delay line in order to detect channel echoes over a transmission channel. As described above, the MEMS based delay line may utilize non-uniformly spaced taps to provide coarser sampling for longer echo delays. In addition, the transceiver also pre-distorts data signal transmissions over the transmission channel such that echoes are removed from a received data signal. The transceiver 500, as depicted in FIG. 5 is utilized, for example in the wireless-LANs as depicted in FIGS. 3A and 3B, such that the transceiver may be encompassed in an adapter card of the various PCs 302.

Referring now to FIG. 5, the transceiver 500 includes a processor 502 having circuitry to execute instructions. A communications interface 520 is coupled to the processor 502 and collectively includes a first MEMS based delay line 530, a delay/amplitude echo map block 540, a second MEMS delay line 550, a plurality of programmable amplifiers 552, a power amplifier 560 and an antenna 570. Accordingly, the transceiver 500 utilizes a first MEMS based delay line 520 and a delay/amplitude echo map block 530 in order to sample a pulse signal received from a communicating transmission station (not shown).

As discussed above, the MEMS based delay line 530 may include one or more taps 532 (532-1, . . . , 532-N). Utilizing the various taps of the MEMS based delay line 520, the delay/amplitude block 540 samples each of the one or more taps in order to determine whether channel echoes are received along with the pulse signal. When an echo is detected, based on a tap 532 of the MEMS based delay line 530, the echo map block 540 determines the delay of the echo and an amplitude of each echo. This process is repeated until the echo map block creates a delay/amplitude echo of the transmission channel. However, those skilled in the art will appreciate that the transceiver 500 is depicted with a first and second MEMS delay line 530/550 for illustration purposes only, such that a specific implementation may multiplex a single MEMS based delay line for both the transmit and receive functions of the transceiver 500.

Once completed, the delay/amplitude echo map is stored in a storage device 504. In addition, the transceiver 500 may transmit the echo map to a receiver station using a back channel 506. The delay/amplitude echo map is then received by a communicating transmission station, which is providing the pulse signals 536 to the transceiver 500. The communicating transmission station continuously transmits a pulse signal 536 to the transceiver 500, for example once every millisecond. This process is repeated until the communicating transmission station receives a delay/amplitude echo map from the transceiver 500.

Once received, the transceiver 500 will begin transmitting pulse signals 562 to the communicating transmission station, such that a delay/amplitude echo map of a reverse transmission channel between the two stations can be completed. Once completed, the delay/amplitude echo map of the reverse channel will be transmitted via the back channel 506 to the transceiver 500. Once received, the transceiver 500 may utilize an echo structure of the echo map in order to pre-distort data signal transmissions over the transmission channel. This process is performed by the MEMS delay line 550.

Accordingly, during signal transmission, the transceiver chipset 511 will transmit a data signal 516, which is provided to the modulator 512. The modulator 512 will modulate the signal 516 and provide the data signal 516 to the MEMS based delay line 550. Utilizing the delay/amplitude echo map of the transmission channel, the processor 502 will attach a programmable amplifier 554 (554-1, . . . , 554-N) to a respective tap 552 (552-1, 552-2, 552-3, . . . , 552-N) of the MEMS based delay line corresponding with a delay of a detected echo. The echo will then be sampled and amplified by an amplifier 554 with an inverse amplitude of the detected echo. As such, the various amplifiers will generate synthetic anti-echoes for each of the echoes detected in the echo map. The various synthetic anti-echoes are then received by the power amp 560 and summed together with the data signal 516 and transmitted over the transmission channel via the antenna 570.

However, the synthetic anti-echoes will also generate echoes. Consequently, the processor will also determine recursive anti-echoes and attach additional programmable amplifiers 554 to taps 552 which capture the recursive anti-echoes. Consequently, the synthetic anti-echoes along with the recursive anti-echoes will be summed together with the data signal 516 and transmitted over the transmission channel via antenna 570. As such, the synthetic anti-echoes and recursive anti-echoes will cancel out with any echoes within the transmission channel, resulting in a virtually echo-free data signal, which is received by a receiving station. In one embodiment, calculation of the recursive anti-echoes is repeated until a signal noise floor or residual echo spectrum of the transmission channel is below a predetermined level such as −10 decibels (db).

Figure 6:
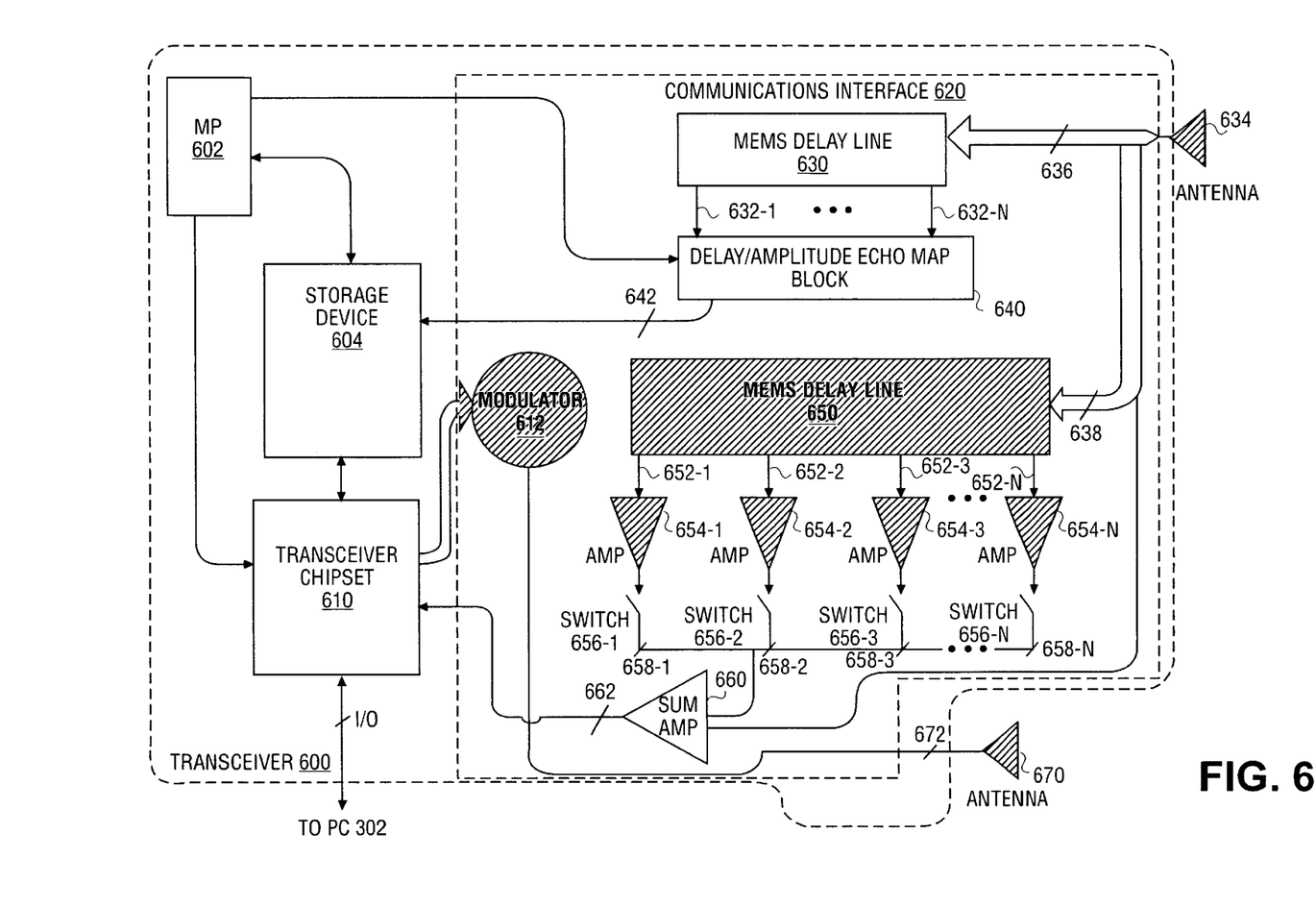
FIG. 6 depicts a block diagram illustrating a transceiver in accordance with a further embodiment of the present invention.

The embodiment of the transceiver 500 described in FIG. 5 illustrates a pre-compensation mode wherein data signals are pre-distorted prior to transmission over the channel. However, post-compensation of received data signals may also be performed, as illustrated by the transceiver 600 as depicted in FIG. 6. However, those skilled in the art will appreciate that a combination pre-compensation/post-compensation transceiver is within the contemplation of the present invention. The transceiver 600 as depicted in FIG. 6 is more or less identical to the transceiver depicted in FIG. 5 with the exception that the transceiver 600 does not include a back channel.

Accordingly, the transceiver 600 contains the requisite circuitry to generate a delay/amplitude echo map based on received pulse signals from a communicating transmission station. However, once the echo map is formed, the echo map is stored, for example, in the storage device 604, and utilized by the MEMS delay line 650 in order to cancel out echoes in received data signals 638. As such, a data signal 638 received via antenna 634 is provided to the MEMS delay line 650.

However, those skilled in the art will appreciate that the transceiver 600 is depicted with a first and second MEMS delay line 630/650 for illustration purposes only, such that a specific implementation may multiplex a single MEMS based delay line for both the transmit and receive functions of the transceiver 600. Accordingly, the processor 602 in accordance with the delay/amplitude echo map of the transmission channel will determine one or more taps 652 (652-1, . . . , 652-N) which capture an echo based on the stored echo map. As such, an amplifier 654 (654-1, . . . , 654-N) will be attached to each of the taps 652 determined by the processor 602. In one embodiment, the mechanical arms are non-uniformly spaced in order to simplify design and provide coarser sampling for longer echo delays, as described in further detail below.

Consequently, the amplifiers 654 will capture the various echoes and generate the synthetic anti-echo by reversing the polarity or amplitude of the echo. As such, the programmable amplifier 652 will generate a synthetic anti-echo 658 (658-1, . . . , 658-N) for each echo indicated by the delay/amplitude echo map of the respective transmission channels. Consequently, a summing amplifier 660 will sum each of the synthetic anti-echoes 658, along with the received data signal 638, which will result in a cancellation of each of the echoes contained in the received data signal 638. Procedural methods of implementing the teachings of the present invention are now described.

Operation

Figure 7:
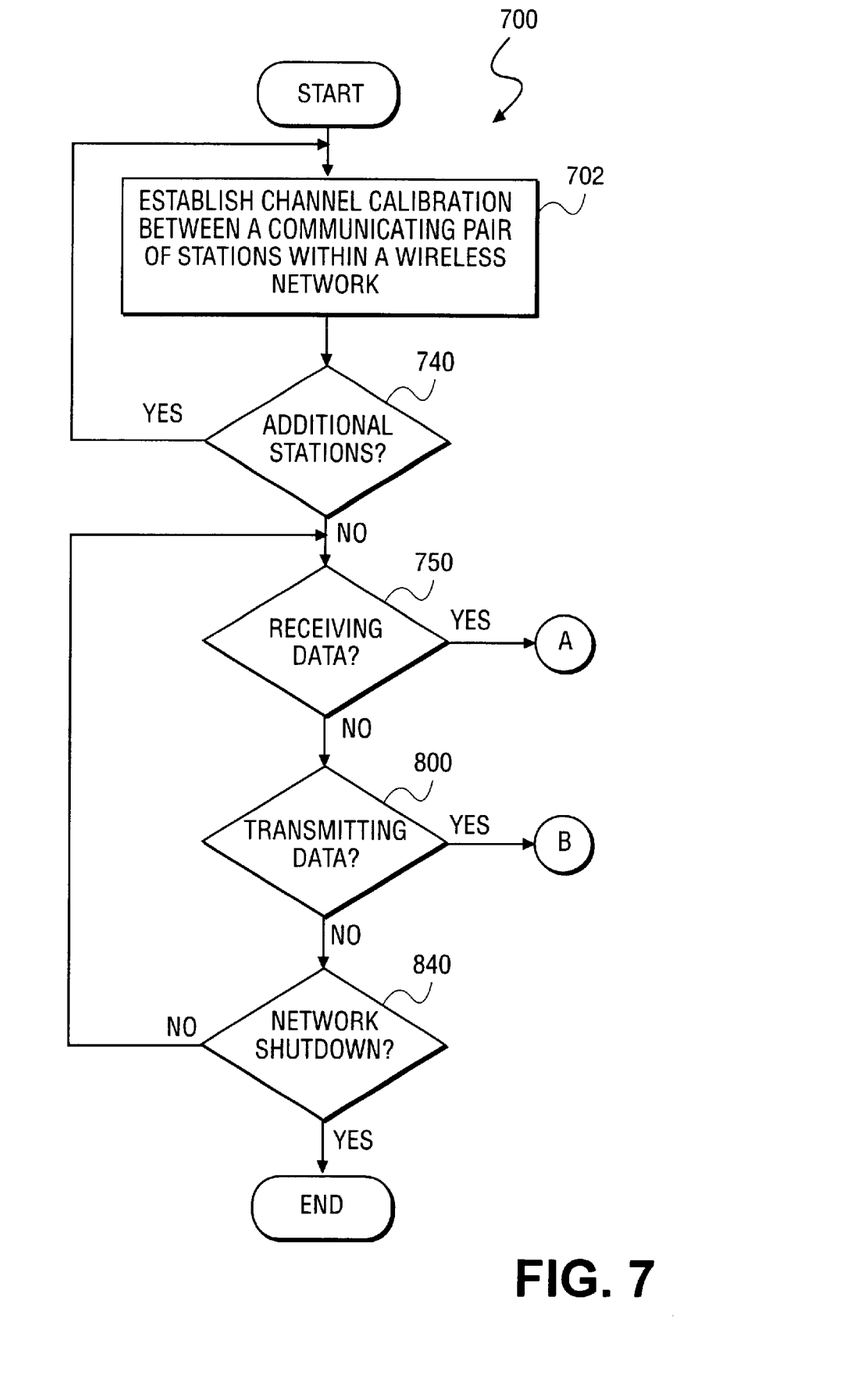
FIG. 7 depicts a block diagram illustrating channel calibration between communicating pairs of stations within a wireless network in order to transmit and receive data that is free of channel echoes in accordance with an embodiment of the present invention.

Referring now to FIG. 7, FIG. 7 depicts a block diagram illustrating a method for calibrating transmission channels within a wireless-LAN, for example as depicted in FIGS. 3A and 3B, utilizing transceivers which communicate utilizing ultra wide bandwidth (UWB) radio signals. As described above, the term "channel calibration" refers to the post-compensation or pre-compensation of data signals in order to remove channel echoes from received signals. At process block 702, channel calibration is established between a communicating pair of stations, for example, 302-1 and 302-2, within a wireless network 300, as depicted in FIG. 3A. At process block 740, it is determined whether an additional pair of stations, for example 302-1 and 302-N, require channel calibration for a transmission channel 304-2 therebetween. As such, channel calibration is repeated for each transmission channel 304 (304-1, . . . , 304-N) within the wireless-LAN network 300.

Once channel calibration is complete, process block 750 is performed. At process block 750, it is determined whether a station 302, or PC, is receiving data. When data is being received, control flow branches to control block A, otherwise, process block 800 is performed. At process block 800, it is determined whether a station 302 is transmitting data. When a station is transmitting data, process block B is performed, otherwise, process block 840 is performed. At process block 840, process blocks 750-800 are repeated until the wireless-LAN is shut down.

Figure 8:
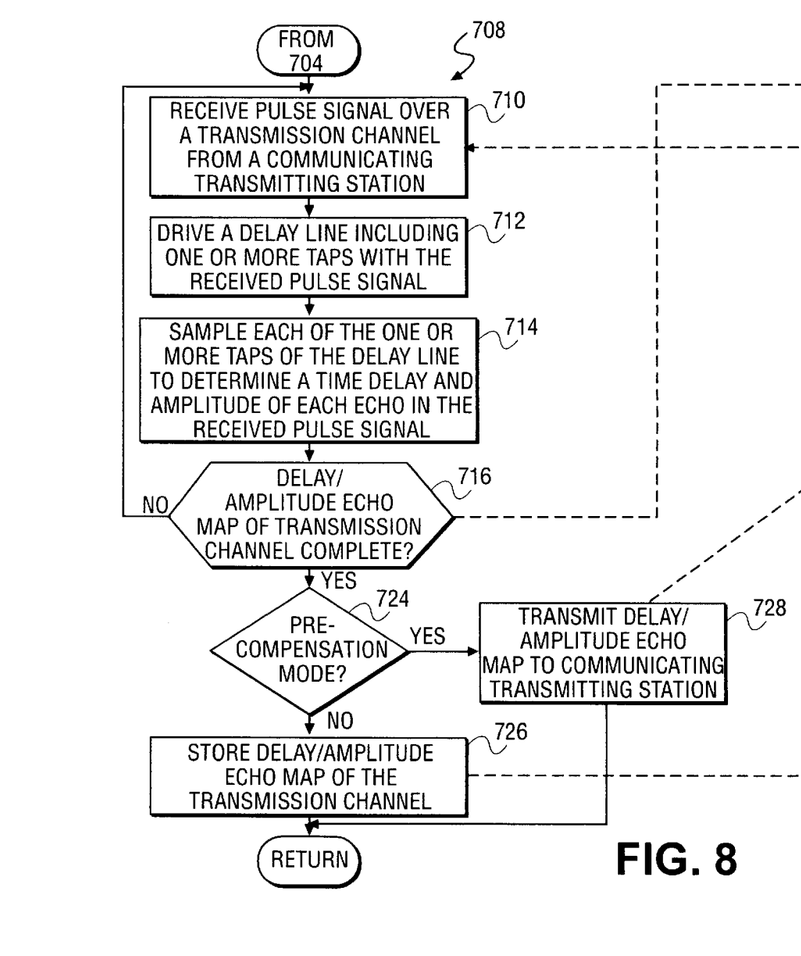
FIG. 8 depicts a block diagram illustrating a method for performing channel calibration of a transmission channel between a communicating pair of stations within a wireless network in accordance with a further embodiment of the present invention.
Figure 9:
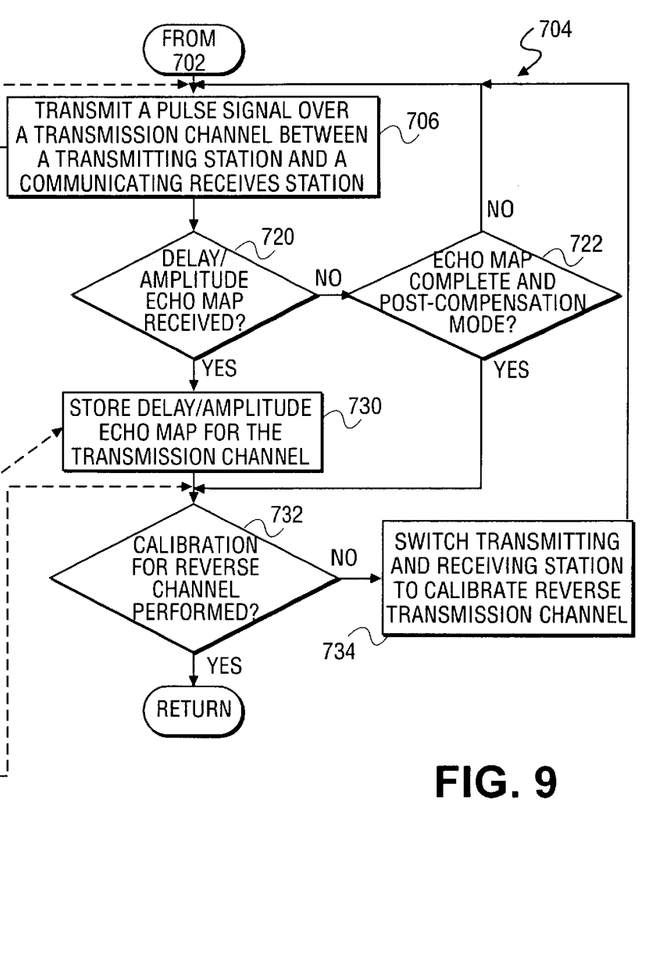
FIG. 9 depicts a block diagram illustrating a method for performing channel calibration of a transmission channel between a communicating pair of stations within a wireless network in accordance with a further embodiment of the present invention.

Referring now to FIG. 8, FIG. 8, in conjunction with FIG. 9, illustrate an additional method for establishing channel calibration between a pair of communicating stations (e.g., 302-1 and 302-2), as illustrated at process block 702 of the method 700 depicted in FIG. 7. Accordingly, at process block 706 of the method 704 as depicted in FIG. 9, a communicating transmission station 302-1 will transmit a pulse signal over a transmission channel between the transmitting station 302-1 and a communicating receiving station 302-2. At process block 710 of the method 708 as depicted in FIG. 8, the receiving station will receive a pulse signal over the transmission channel 304-1 from the communicating transmission station 302-1.

Once received, at process block 712, the receiving station 302-2 will drive a MEMS based delay line, including one or more taps, with the received pulse signal. In one embodiment, the MEMS delay line is designed with closely spaced taps at a start of the delay line in order to capture echoes within close proximity to the incident pulse requiring precise time calculations for cancellation. In this embodiment, the taps are gradually further spaced apart towards an end of the delay line in order to capture echoes, which occur further away from the incident pulse and therefore do not require precise time calculations for cancellation.

At process block 714, the receiving station will sample each of the one or more taps of the delay line to determine a time delay and amplitude of each echo detected in the received pulse signal. At process block 716, process blocks 710-712 are repeated until a delay/amplitude echo map of the transmission channel is complete. Once the echo map is complete, process block 724 is performed. At process block 724, it is determined whether the receiving station is in pre-compensation mode.

A transmission station utilizing pre-compensation mode is depicted in the embodiment illustrated with reference to FIG. 5. When the transceiver 500 or receiving station 302-2 is in pre-compensation mode, process block 728 is performed. At process block 728, the receiving station 302-2 will transmit the delay/amplitude echo map to the communicating transmission station 302-1. Otherwise, the receiving station 302-2 is in post-compensation mode, as depicted with reference to the embodiment of the transceiver 600 illustrated in FIG. 6. As such, at process block 726, the receiving station will store the delay/amplitude echo map of the transmission channel.

Referring again to the method 704 depicted in FIG. 9, the transmission station 302-1 will repeatedly transmit a pulse signal to the receiving station 302-2 until the transmission station 302-1 receives a delay/amplitude echo map of the channel for pre-compensation mode. However, if the transmission station 302-1 is in post-compensation mode, the transmission station 302-1 will transmit a pulse signal to the receiving station 302-2 until the receiving station 302-2 has completed the echo map. As such, process block 732 is performed. Otherwise, once the delay/amplitude echo map is received at process block 720, process block 730 is performed. At process block 730, the transmitting station 302-1 will store the received delay/amplitude echo map for transmission channel 304-1.

At process block 732, it is determined whether a reverse transmission channel 306-1 between the communicating stations 302-1 and 302-2 has been performed. If the reverse channel 306-1 has not been calibrated, process block 734 is performed. At process block 734, the transmission station 302-1 is switched with the receiving station 302-2 such that the transmitting station 302-2 will now become the receiving station 302-1 and the receiving station 302-1 will now become the communicating transmission station 302-2 such that the reverse channel 306-1 between the stations can be calibrated. Consequently, process blocks 706-732 will be repeated until the reverse channel 306-1 is calibrated and control returns to process block 702 of the method 700, as depicted in FIG. 7.

Figure 10:
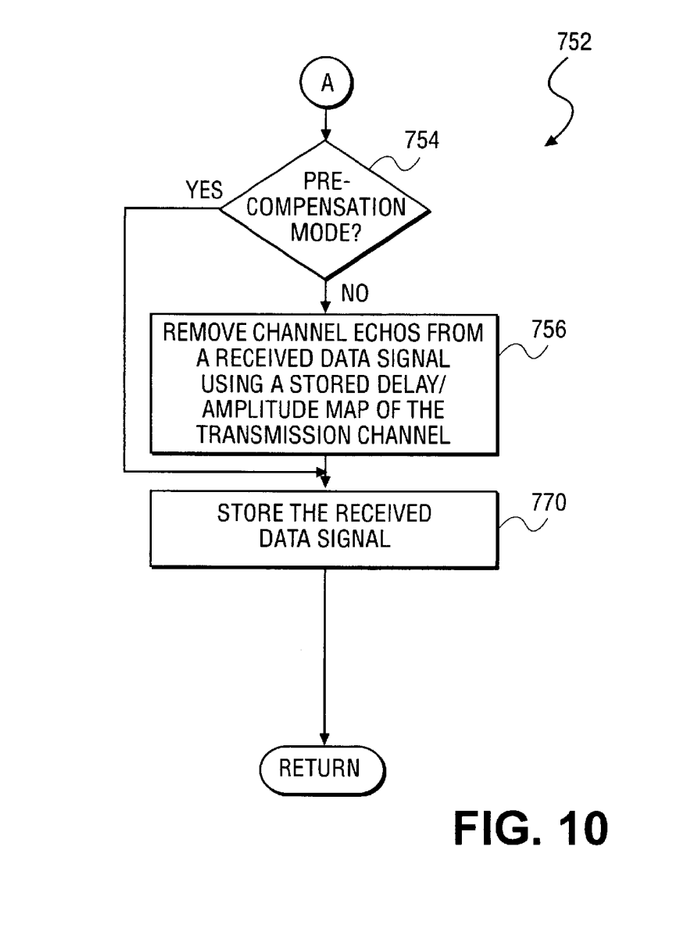
FIG. 10 depicts a block diagram illustrating an additional method for receiving data within a wireless network as taught by the present invention and in accordance with a further embodiment of the present invention.

Referring now to FIG. 10, a method 752 for receiving data signals by a transceiver station 302-2 in accordance with an embodiment of the present invention is described. At process block 764, it is determined whether the receiving station 302-1 is in pre-compensation mode (see FIG. 5). When the receiving station is in pre-compensation mode, process block 770 is performed. At process block 770, received data 638 has been pre-distorted by the transmitting station and therefore, the received data signal should be free of channel echoes and is therefore stored. Otherwise, process block 756 is performed. At process block 756, the receiving station 302-2 will remove channel echoes from the received data signal using a stored delay/amplitude echo map 642 of the respective transmission channel 304-1 (see FIGS. 3A and 6). Once channel echoes are removed from the received data signal 638, the post-compensated data signal 662 is stored at process block 770.

Figure 11:
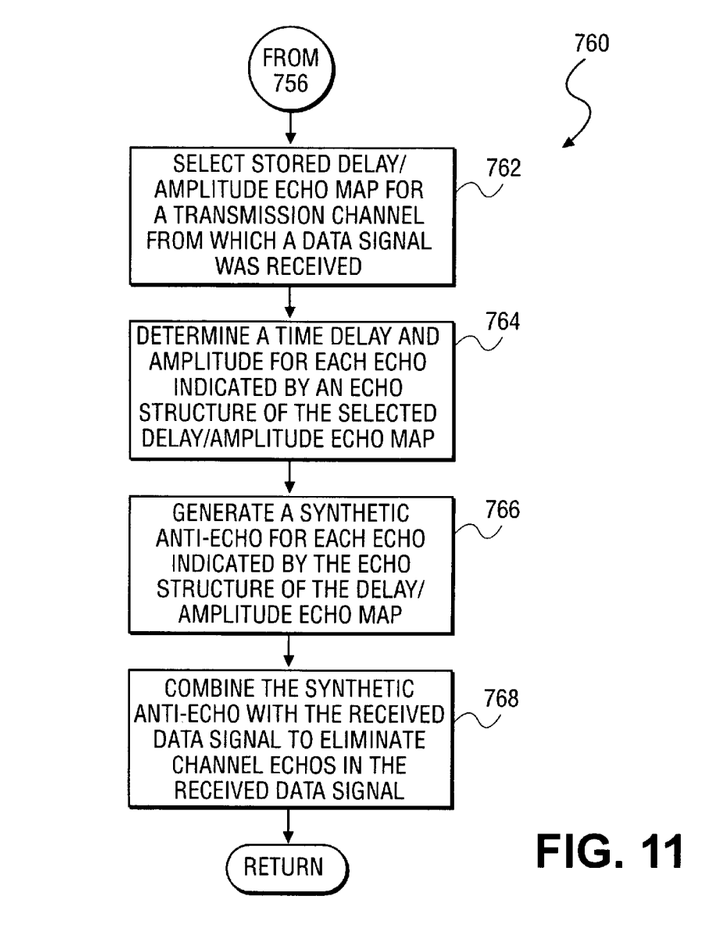
FIG. 11 depicts a block diagram illustrating an additional method for removing channel echoes from data received over a transmission channel in accordance with a further embodiment of the present invention.

Referring now to FIG. 11, an additional method 760 for removing channel echoes from a received data signal (post-compensation mode) is depicted, for example, in the transceiver 600 as depicted in FIG. 6. At process block 762, the transceiver 600 selects a stored delay/amplitude echo map 642 from the storage device 604. The stored delay/amplitude echo map 642 is selected based on the transmission channel 304 (304-1, . . . , 304-N) or 306 (306-1, . . . , 306-N), from which the data shall be received. As such, post-compensation mode transceivers 600 will include a stored delay/amplitude echo map for each transmission channel 304/306 from which data is received. At process block 764, the transceiver 600 will determine a time delay and amplitude for each echo indicated by an echo structure of the selected delay/amplitude echo map 642.

Once determined, the processor will couple a programmable amplifier 654 to each tap 652 of the MEMS based delay line 650, corresponding with the time delay of each detected echo. At process block 766, the transceiver 600 will generate a synthetic anti-echo 658 for each echo indicated by the echo structure of the delay/amplitude echo map. Generation of the synthetic anti-echoes 658 is performed by selecting each channel echo with a programmable amplifier 654 coupled to the respective tap 652 and reversing the amplitude of the echo in order to generate a synthetic anti-echo 658. Finally, at process block 768, the synthetic anti-echoes are combined with the received data signal 638 in order to eliminate channel echoes and the received data signal utilizing the summation amplifier 660.

Figure 12:
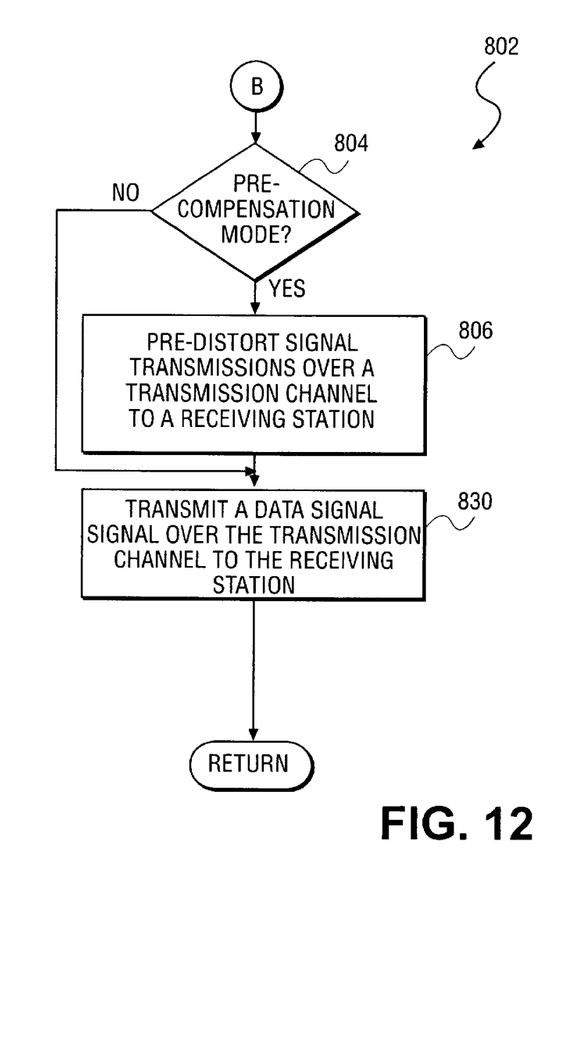
FIG. 12 depicts a block diagram illustrating an additional method for transmitting data within a local area wireless network in accordance with a further embodiment of the present invention.

Referring now to FIG. 12, an additional method 802 is depicted for illustrating transmission of data by a transceiver utilizing UWB radio signals in accordance with an embodiment of the present invention. The transceiver will either be a pre-compensation mode transceiver, for example as depicted in FIG. 5, or a post-compensation mode transceiver, for example as depicted in FIG. 6. At process block 804, it is determined whether the transceiver functions in pre-compensation mode. When the transceiver functions in pre-compensation mode, process block 806 is performed. Otherwise, the transceiver is functioning in post-compensation mode and process block 830 is performed.

At process block 806, a station 302-1 is functioning in pre-compensation mode utilizing, for example, a transceiver 500 as depicted in FIG. 5. At process block 806, the transceiver 500 pre-distorts signal transmissions over the transmission channel 304-1 between the transceiver 500 and a receiving station 302-2. Otherwise, the transceiver 600 is functioning in post-compensation mode, as indicated at process block 830 and therefore does not perform any modifications to data signals (see FIG. 6). Consequently, at process block 830, the transceiver 600 transmits a data signal over the transmission channel 304-1 to the receiving station 302-2.

Figure 13:
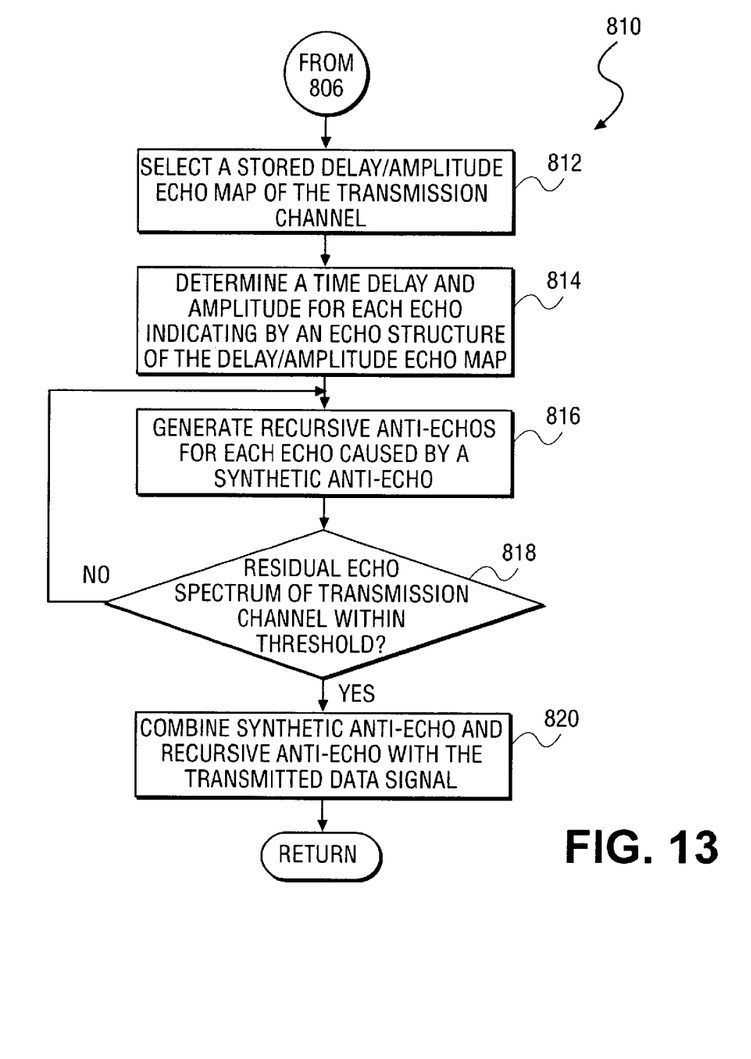
FIG. 13 depicts a block diagram illustrating an additional method for pre-distorting signal transmissions over a transmission channel in order to eliminate channel echoes in a received data signal in accordance with a further embodiment of the present invention.

Finally, FIG. 13 illustrates an additional method 810 for performing pre-distortion of data signals (pre-compensation mode) within a transceiver such as the transceiver 500 as depicted in FIG. 5. At process block 812, the transceiver will select a stored delay/amplitude echo map 542 of a transmission channel 304-1 between the transceiver 500 and a receiving station 302-2. At process block 814, the transceiver 500 will determine a time delay and amplitude for each echo indicated by an echo structure of the selected delay/amplitude echo map 542. However, due to the fact that synthetic anti-echoes will also result in echoes when transmitted over the transmission channel 304-1, the transceiver 500 must generate recursive anti-echoes.

As such, at process block 816, the transceiver 500 will generate recursive anti-echoes for each echo caused by a synthetic anti-echo. At process block 818, process block 816 is repeated until a residual echo spectrum of the transmission channel is within a pre-determined threshold, such as for example, −10 db. Once this is the case, process block 820 is performed. At process block 820, the synthetic anti-echoes and the recursive anti-echoes 558 are combined with the data signal 516 using the power amp 560. Consequently, once the data signal and synthetic anti-echoes and recursive anti-echoes are broadcast over the transmission channel 304-1, the synthetic and recursive anti-echoes will cancel out any echoes caused by the data signal when transmitted over the transmission channel 304-1.

Alternate Embodiments

Several aspects of one implementation of the wireless-LAN utilizing UWB radio signal for providing echo-free received data signals and removing echoes from received data signals have been described. However, various implementations of the wireless-LAN provide numerous features including, complementing, supplementing, and/or replacing the features described above. Features can be implemented as part of a wireless adapter card for PC or as part of transceiver stations in different implementations, as well as combination pre-compensation/post-compensation transceivers. In addition, the foregoing description, for purposes of explanation, used specific nomenclature to provide a thorough understanding of the invention. However, it will be apparent to one skilled in the art that the specific details are not required in order to practice the invention.

In addition, although an embodiment described herein is directed to a wireless-LAN, it will be appreciated by those skilled in the art that the teaching of the present invention can be applied to other systems. In fact, systems for wireless communication utilizing UWB signals are within the teachings of the present invention, without departing from the scope and spirit of the present invention. The embodiments described above were chosen and described in order to best explain the principles of the invention and its practical applications. These embodiment were chosen to thereby enable others skilled in the art to best utilize the invention and various embodiments with various modifications as are suited to the particular use contemplated.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Changes may be made in detail, especially matters of structure and management of parts within the principles of the present invention to the full extent indicated by the broad general meaning of the terms in which the appended claims are expressed.

The present invention provides many advantages over known techniques. The present invention includes the ability to provide wireless-LAN networks with virtually echo-free signal transmission. Accordingly, high bandwidth allocation for wireless-LANs will enable, at a relatively low cost, wiring of various buildings, such as classrooms, in the United States. Such high bandwidth allocation is provided by UWB radio signals, which have the ability to remove multi-path effects by pulse shaping and timing discrimination techniques. Accordingly, virtually echo-free wireless-LANs are provided by the present invention by combining UWB radio signals with MEMS based delay-lines in order to remove channel echoes from received data signals.

Having disclosed exemplary embodiments, modifications and variations may be made to the disclosed embodiments while remaining within the scope of the invention as defined by the following claims.

What is claimed is:

1. A method comprising:
   receiving a pulse signal from a communicating transmitting station over a transmission channel between the communicating transmitting station and a receiving station;
   driving a delay line including one or more taps with the received pulse signal;
   sampling each of the one or more taps of the delay line to determine a time delay and amplitude of each echo in the received pulse signal; and
   repeating the receiving, driving and sampling for each received pulse signal from the communicating transmitting station until a delay/amplitude echo map of the transmission channel between the communicating transmitting station and the receiving station is complete.

2. The method of claim 1, further comprising:
   transmitting the delay/amplitude echo map of the transmission channel to the communicating transmission station.

3. The method of claim 1, further comprising:
   removing channel echoes from input transmission signals received by the receiving station using an echo structure of the delay/amplitude echo map of the channel.

4. The method of claim 3, wherein the removing channel echoes from input transmission signals further comprises:
   determining a time delay and amplitude for each echo indicated by the echo structure of the delay/amplitude echo map;
   generating a synthetic anti-echo for each echo indicated by the delay/amplitude echo map, each respective synthetic anti-echo having an equal time delay and an inverse amplitude of each respective echo; and
   when receiving a data signal over the transmission channel, combining the synthetic anti-echoes with the received data signal, thereby eliminating channel echoes in the received data signal.

5. The method of claim 1, further comprising:
   transmitting a pulse signal to a communicating receiving station over a reverse transmission channel between a transmitting station and the communicating receiving station; and
   repeating the transmitting of the pulse signal over the reverse transmission channel between the transmitting station and the communicating receiving station until a delay/amplitude map of the reverse transmission channel is received from the communicating receiving station.

6. The method of claim 5, further comprising:
   pre-distorting signal transmissions over the reverse transmission channel between the transmitting station and the communicating receiving station in order to eliminate channel echoes in a received data signal.

7. The method of claim 6, wherein the pre-distorting further comprises:
   determining a time delay and amplitude for each echo indicated by the received delay/amplitude map;
   generating a synthetic anti-echo for each echo indicated by the received delay/amplitude map, each respective synthetic anti-echo having an equal time delay and an inverse amplitude of each respective echo;
   recursively generating recursive anti-echoes for echoes caused by synthetic anti-echoes until a residual echo spectrum of the reverse transmission channel is below a predetermined threshold; and
   when transmitting a data signal over the reverse transmission channel, combining the synthetic anti-echoes and the recursive anti-echoes with the transmitted data signal, thereby eliminating channel echoes in the received data signal.

8. An apparatus comprising:
   a processor having circuitry to execute instructions;
   a communications interface coupled to the processor, the communications interface to transmit data signals to one or more communicating receiving stations, and to receive data signals from the one or more communicating transmitting stations;
   a delay line coupled to the communications interface, the delay line including one or more taps;
   a storage device coupled to the processor, having sequences of instructions stored therein, which when executed by the processor cause the processor to:
      receive a pulse signal from a communicating transmitting station over a transmission channel between the communicating transmitting station and a receiving station, drive the delay line including one or more taps with the received pulse signal, sample each of the one or more taps of the delay line to determine a time delay and amplitude of each echo in the received pulse signal, and repeat the receiving, driving and sampling for each received pulse signal from the communicating transmitting station until a delay/amplitude echo map of the transmission channel between the communicating transmitting station and the receiving station is complete.

9. The apparatus of claim 8, wherein the process is further caused to:

transmit the delay/amplitude echo map of the transmission channel to the communicating transmission station.

10. The apparatus of claim 8, wherein the processor is further caused to:

remove channel echoes from input transmission signals received by the receiving station using an echo structure of the delay/amplitude echo map of the channel.

11. The apparatus of claim 10, wherein the instruction to remove channel echoes from input transmission signals further causes the processor to:

determine a time delay and amplitude for each echo indicated by the echo structure of the delay/amplitude echo map, generate a synthetic anti-echo for each echo indicated by the delay/amplitude echo map, each respective synthetic anti-echo having an equal time delay and an inverse amplitude of each respective echo, when receiving a data signal over the transmission channel, combine the synthetic anti-echoes with the received data signal, thereby eliminating channel echoes in the received data signal.

12. The apparatus of claim 8, wherein the processor is further caused to:

transmit a pulse signal to a communicating receiving station over a reverse transmission channel between a transmitting stations and the communicating receiving station; and repeat the transmitting of the pulse signal over the reverse transmission channel between the transmitting station and the communicating receiving station until a delay/amplitude map of the reverse transmission channel is received from the communicating receiving station.

13. The apparatus of claim 12, wherein the processor is further caused to:

pre-distort signal transmissions over the reverse transmission channel between the transmitting station and the communicating receiving station in order to eliminate channel echoes in a received data signal.

14. The apparatus of claim 13, wherein the instruction to pre-distort signal transmissions further causes the processor to:

determine a time delay and amplitude for each echo indicated by the received delay/amplitude map, generate a synthetic anti-echo for each echo indicated by the received delay/amplitude map, each respective synthetic anti-echo having an equal time delay and an inverse amplitude of each respective echo, recursively generating recursive anti-echoes for echoes caused by synthetic anti-echoes until a residual echo spectrum of the transmission channel is below a predetermined threshold, and when transmitting a data signal over the reverse transmission channel, combining the synthetic anti-echoes and the recursive anti-echoes with the transmitted data signal, thereby eliminating channel echoes in the received data signal.

15. The apparatus of claim 8, wherein the taps of the delay line are non-uniformly spaced, such that when driven by the pulse signal, the non-uniform taps enable sampling of varying delay echoes.

16. A system comprising:

a plurality of communicating stations coupled together to form a wireless network, wherein each communicating stations includes:

a processor having circuitry to execute instructions;

a communications interface coupled to the processor, the communications interface to transmit data signals to one or more communicating receiving stations, and to receive data signals from the one or more communicating transmitting stations;

a delay line coupled to the communications interface, the delay line including one or more taps;

a storage device coupled to the processor, having sequences of instructions stored therein, which when executed by the processor cause the processor to:

receive a pulse signal from a communicating transmitting station over a transmission channel between the communicating transmitting station and a receiving station, drive the delay line including one or more taps with the received pulse signal, sample each of the one or more taps of the delay line to determine a time delay and amplitude of each echo in the received pulse signal, and repeat the receiving, driving and sampling for each received pulse signal from the communicating transmitting station until a delay/amplitude echo map of the transmission channel between the communicating transmitting station and the receiving station is complete.

17. The system of claim 16, wherein each communicating station further includes:

a back channel to transmit the delay/amplitude echo map of the transmission channel to the communicating transmission station.

18. The system of claim 16, wherein the communication interface further comprises:

a post-compensation delay line including one or more taps;

a plurality of programmable amplifiers, each respective amplifier coupled to a respective tap and set to a programmed amplitude based on the echo map in order to generate a synthetic anti-echo for each echo indicated by the delay/amplitude echo map, each respective synthetic anti-echo having an equal time delay and an inverse amplitude of each respective echo; and a summing amplifier to receive a data signal over the transmission channel, combine the synthetic anti-echoes with the received data signal, thereby eliminating channel echoes in the received data signal.

19. The system of claim 16, wherein the communications interface further comprises:

a pre-compensation delay line including one or more taps;

a plurality of programmable amplifiers, each respective amplifier coupled to a respective tap and set to a programmed amplitude based on the echo map in order to generate a synthetic anti-echo for each echo indicated by the delay/amplitude echo map, each respective synthetic anti-echo having an equal time delay and an inverse amplitude of each respective echo; and a summing amplifier to receive a data signal over the transmission channel, combine the synthetic anti-echoes with the received data signal, thereby eliminating channel echoes in the received data signal.

20. The system of claim 16, wherein the taps of the delay line are non-uniformly spaced, such that when driven by the pulse signal, the non-uniform taps enable sampling of varying delay echoes.

* * * * *